(12) United States Patent
Takaoka (10) Patent No.: US 7,394,498 B2
(45) Date of Patent: Jul. 1, 2008

(54) LIQUID-CRYSTAL LIGHT-AMOUNT ADJUSTING DEVICE, METHOD OF DRIVING LIQUID-CRYSTAL LIGHT-AMOUNT ADJUSTING DEVICE, AND CAMERA INCLUDING THE LIQUID-CRYSTAL LIGHT-AMOUNT ADJUSTING DEVICE

(75) Inventor: Toshifumi Takaoka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/973,194

(22) Filed: Oct. 5, 2007

(65) Prior Publication Data

US 2008/0074532 A1    Mar. 27, 2008

Related U.S. Application Data

(63) Continuation of application No. 10/468,274, filed as application No. PCT/JP02/11965 on Nov. 15, 2002, now abandoned.

(30) Foreign Application Priority Data

Dec. 18, 2001  (JP) .......................... P2001-384385

(51) Int. Cl.
*H04N 5/238*  (2006.01)
*H04N 5/235*  (2006.01)
*H04N 5/225*  (2006.01)
*G03B 7/00*   (2006.01)
*G02F 1/1335* (2006.01)

(52) U.S. Cl. ...................... 348/363; 348/340; 348/362; 349/104

(58) Field of Classification Search ................. 348/335, 348/340, 362–7; 345/53, 101; 349/72, 104–5, 349/110–111
See application file for complete search history.

(56) References Cited

U.S. PATENT DOCUMENTS 4,692,798 A    9/1987    Seko et al. ................... 348/118

FOREIGN PATENT DOCUMENTS

EP           1 099 976 A2    5/2001

(Continued)

OTHER PUBLICATIONS

English translation of Japanese Patent Publication 55-87126 translated by: FLS, Inc. Nov. 2006.

(Continued)

*Primary Examiner*—John M. Villecco
*Assistant Examiner*—Dan Pasiewicz
(74) *Attorney, Agent, or Firm*—Frommer Lawrence & Haug LLP; William S. Frommer; Paul A. Levy (57) ABSTRACT

A liquid-crystal light-amount adjusting device in which the effective power of driving pulses for acceleration is optimized to improve response characteristics of optical transmittance, a method of driving the apparatus, and a camera including the apparatus. The liquid-crystal light-amount adjusting device according to the present invention includes a driving-pulse generating circuit (16) for generating driving pulses having pulsed voltages, a liquid-crystal light-amount adjusting unit (12) for changing the optical transmittance of a liquid crystal according to pulse shapes of the driving pulses, and a microcomputer (19) for controlling frequencies and duty ratios of the driving pulses. The microcomputer (19) exercises control so that the driving-pulse generating circuit (16) generates driving pulses including driving pulses for acceleration, having a pulse shape with a first frequency and a first duty ratio, and driving pulses for dimming, having a pulse shape with a second frequency that is different from the first frequency and a second duty ratio that is different from the first duty ratio.

6 Claims, 8 Drawing Sheets

U.S. PATENT DOCUMENTS

| | | | |
|---|---|---|---|
| 4,720,717 A | 1/1988 | Ohta et al. | 347/136 |
| 4,810,062 A | 3/1989 | Aoki et al. | 349/3 |
| 5,308,246 A | 5/1994 | Balocco | 434/236 |
| 5,986,705 A * | 11/1999 | Shibuya et al. | 348/362 |
| 6,501,443 B1 | 12/2002 | McMahon | 345/52 |

FOREIGN PATENT DOCUMENTS

| | | |
|---|---|---|
| JP | 55-87126 | 1/1980 |
| JP | 62-118326 | 5/1987 |
| JP | 7-129134 | 5/1995 |
| JP | 11-95206 | 4/1999 |
| JP | 2000-98347 | 4/2000 |

OTHER PUBLICATIONS

English Abstract for IDS Japanese reference 11-95206 published Apr. 9, 1999 to Kawada et al.

English Abstract for IDS Japanese reference 7-129134 published May 19, 1995 to Yamagishi et al.

English Abstract for IDS Japanese reference 62-118326 published May 29, 1987 to Enari et al.

* cited by examiner

LIQUID-CRYSTAL LIGHT-AMOUNT ADJUSTING DEVICE, METHOD OF DRIVING LIQUID-CRYSTAL LIGHT-AMOUNT ADJUSTING DEVICE, AND CAMERA INCLUDING THE LIQUID-CRYSTAL LIGHT-AMOUNT ADJUSTING DEVICE

This application is a continuation of application Ser. No. 10/468,274, filed Aug. 18, 2003 now abandoned under 35 USC 371 from International Application PCT/JP02/11965, filed Nov. 15, 2002 with a claim of priority under 35 USC 119 to Japanese Application 2001-384385, filed in Japan on Dec. 18, 2001, the entirety thereof being incorporated herein by reference.

BACKGROUND

1. Technical Field

The present invention relates to a liquid-crystal light-amount adjusting device that controls the amount of transmitting light, and to an apparatus for driving the liquid-crystal light-amount adjusting device. The present invention also relates to a camera in which the liquid-crystal light-amount adjusting device is used as a diaphragm.

2. Background Art

In cameras such as video cameras with built-in cameras, electronic still cameras, and still cameras, diaphragms are provided so that aperture values can be changed.

Figure 8:
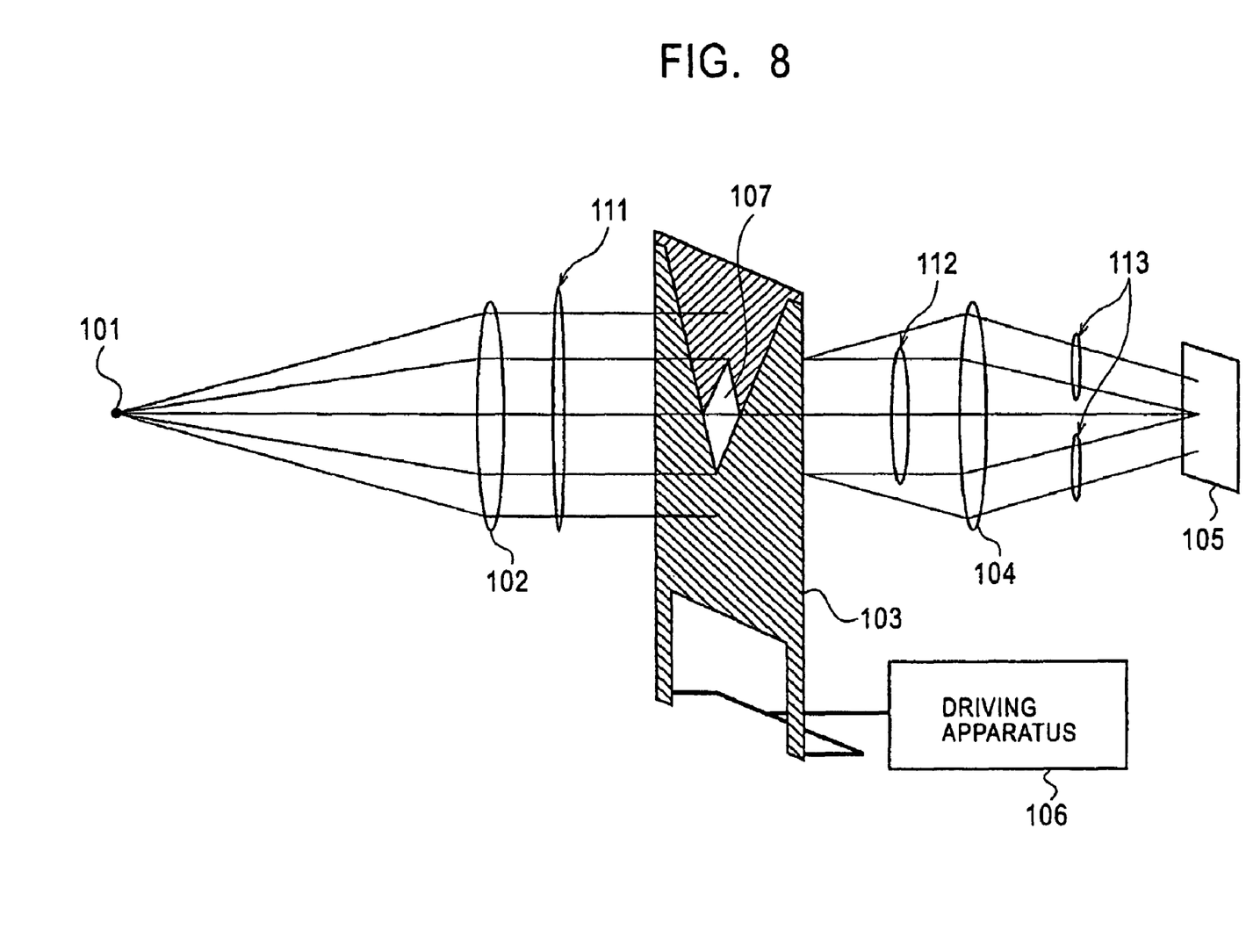
FIG. 8 is a schematic diagram showing an optical system of a conventional camera.

FIG. 8 is a schematic diagram showing an optical system of a conventional camera.

Referring to FIG. 8, light coming from a point 101 of a target becomes parallel beams 111 through a lens 102, and the parallel beams are partially blocked by a dual-blade diaphragm 103 and remaining beams 112 are transmitted, forming an image on an imaging surface of an imaging device 105 through a lens 104. The amount of light that transmits through the two-blade diaphragm 103 is adjusted by changing the area of a diaphragm aperture 107 by moving the blades of the two-blade diaphragm 103 by a driving apparatus 106.

The method described above, in which the amount of light that reaches the imaging device 105 from the target is adjusted by partially blocking light coming from the target by the diaphragm, causes diffraction at the edges of the blades, allowing diffracted light 113 to also reach the imaging device 105. The diffracted light 113 reaches a point that is different from the focus of the main light 112, causing degradation in resolution. The degree of degradation in resolution due to the diffraction is determined by the ratio between the amount of the light 112 that transmits through the diaphragm aperture 107 and the amount of the diffracted light 113 that diffracts at the edges of the diaphragm aperture 107, and it therefore becomes larger as the size of the camera is reduced and the size of the diaphragm is reduced accordingly. Thus, this problem is significant considering the recent miniaturization of cameras.

In order to overcome the problem, as an alternative to a blade diaphragm, a liquid-crystal light-amount adjusting device that employs liquid crystal has been proposed. The liquid-crystal light-amount adjusting device is disposed in place of a blade diaphragm. Since the optical transmittance is substantially uniform over the entire surface on which light is incident, and the optical transmittance can be controlled continuously, the liquid-crystal light-amount adjusting device allows adjustment of the amount of light without causing degradation in resolution due to diffraction. That is, the aperture value can be adjusted.

In the liquid-crystal light-amount adjusting device, in order to achieve quick response in changing the optical transmittance, a voltage that is higher (or lower) than a target voltage for achieving a specified optical transmittance (a driving voltage for acceleration) is applied to a liquid crystal for a short period. By supplying a certain electric power by the driving voltage for acceleration, a large driving force is exerted on the liquid-crystal molecules in the process of changing the orientation of the liquid crystal.

When the driving voltage for acceleration is applied by pulses, the pulses must be applied for an optimal time in order to achieve optimal response characteristics. For that purpose, the resolution increases as the frequency of the pulses becomes higher, allowing delicate control of the time of application.

However, since the liquid-crystal light-amount adjusting device is electrically a capacitor having the liquid crystal held between electrodes, a large amount of power is consumed at pulse edges if the frequency is high. In order to reduce power consumption, it is possible to reduce the current by disposing a resistor in series with the liquid crystal held between the electrodes. However, according to this method, a low-pass filter is formed by the liquid crystal and the capacitor, causing degradation in the response characteristics of the liquid crystal. Thus, from the viewpoint of reducing power consumption, the frequency of the pulses is preferably as low as possible.

As described above, the frequency of the pulses of the driving voltage for acceleration must satisfy contradicting requirements.

Accordingly, it is an object of the present invention to provide a liquid-crystal light-amount adjusting device and a liquid-crystal light-amount adjusting method that allow delicate control of a driving power for acceleration.

It is another object of the present invention to provide a camera in which the liquid-crystal light-amount adjusting device is used as a diaphragm to avoid degradation in resolution due to diffraction.

BRIEF SUMMARY OF THE DISCLOSURE

According to the present invention, the frequency of driving pulses for acceleration and the frequency of driving pulses for dimming are allowed to be different. Thus, the effective power of the driving pulses for acceleration can be optimized in accordance with driving status of a liquid-crystal light-amount adjusting device. Accordingly, a liquid-crystal light-amount adjusting device that exhibits favorable response characteristics can be implemented. Furthermore, a liquid-crystal light-amount adjusting device with low power consumption can be implemented. Furthermore, a liquid-crystal light-amount adjusting device with an extended lifetime can be implemented since DC components can be suppressed.

DETAILED DESCRIPTION

Now, an embodiment of the present invention will be described with reference to the drawings. The same parts are denoted by the same numerals throughout the drawings, and descriptions thereof will be omitted.

Figure 1:
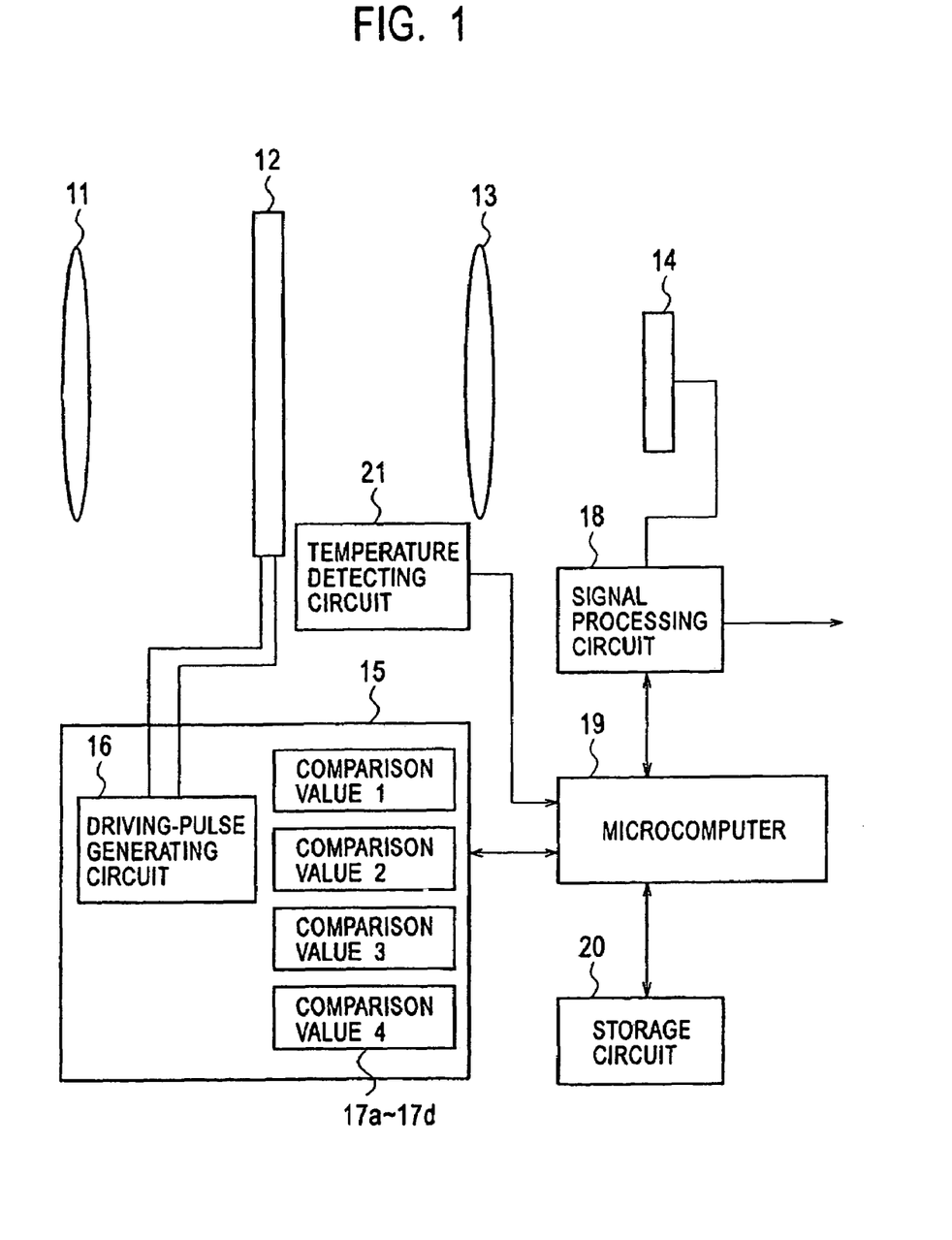
FIG. 1 is a diagram showing the construction of a camera according to an embodiment of the present invention.

FIG. 1 is a diagram showing the construction of a camera according to an embodiment of the present invention.

Referring to FIG. 1, the camera according to this embodiment includes lenses 11 and 13, a liquid-crystal light-amount adjusting unit 12, an imaging device 14, a driving circuit 15, a signal processing circuit 18, a microcomputer 19, a storage circuit 20, and a temperature detecting circuit 21.

Light coming from a target (not shown) is adjusted by the lens 11 to become substantially parallel beams, and the parallel beams enter the liquid-crystal light-amount adjusting unit 12.

The incident light is adjusted by the liquid-crystal light-amount adjusting unit 12 so that an adjusted amount of light will be transmitted, and the resulting light enters the lens 13. Since the liquid-crystal light-amount adjusting unit 12 alters optical transmittance substantially uniformly over the entire surface on which the light is incident, the light incident on the liquid-crystal light-amount adjusting unit 12 is dimmed substantially uniformly when it comes out. That is, the light that comes out of the lens 11 transmits the liquid-crystal light-amount adjusting unit 12 by a specified optical transmittance with no change between an area of the incident surface and an area of the emitting surface of the liquid-crystal light-amount adjusting unit 12.

Figure 2:
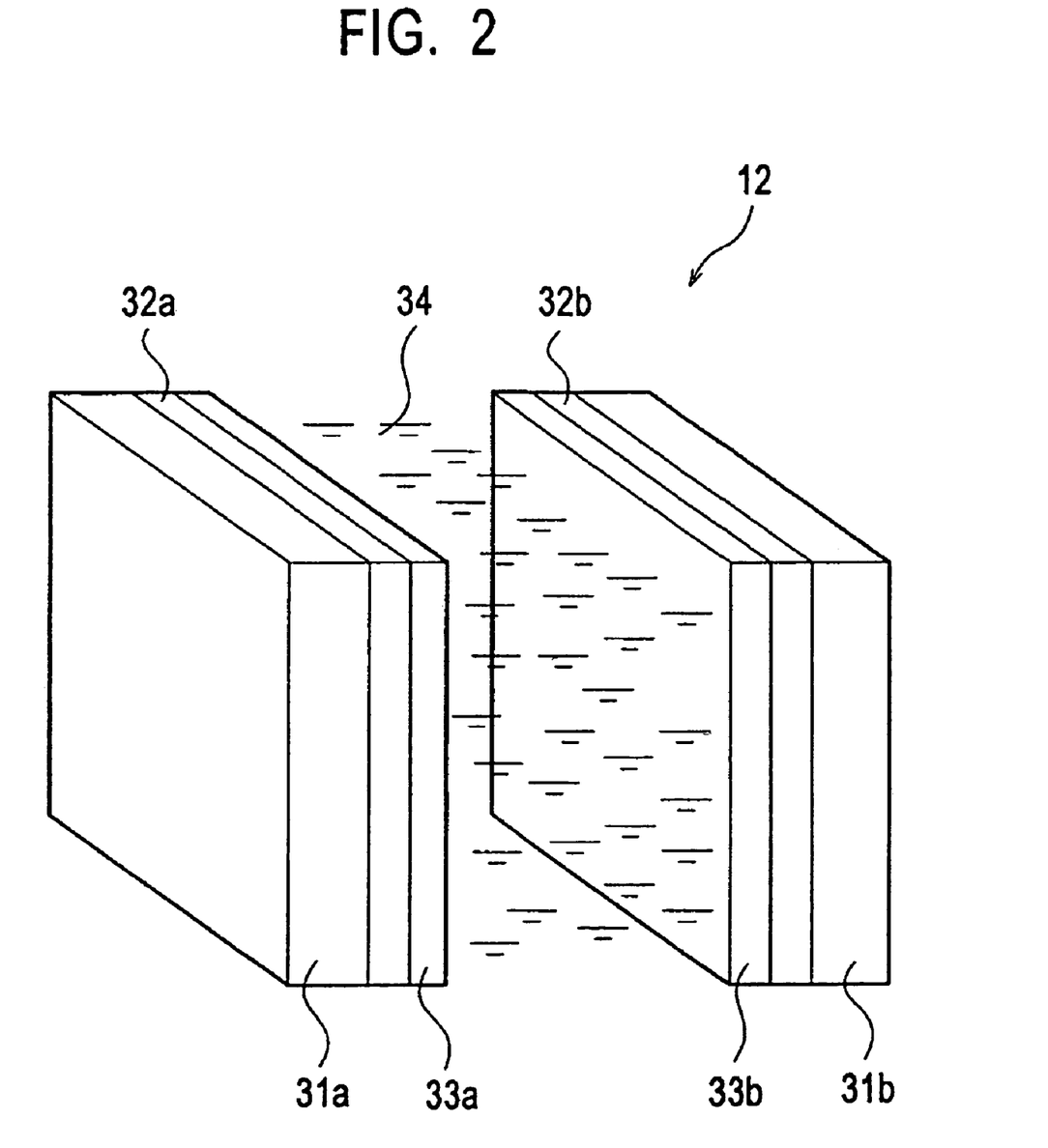
FIG. 2 is a diagram showing the construction of a liquid-crystal light-amount adjusting unit.

FIG. 2 is a diagram showing the construction of the liquid-crystal light-amount adjusting unit.

Referring to FIG. 2, the liquid-crystal light-amount adjusting unit 12 includes substrates 31a and 31b, electrodes 32a and 32b, oriented films 33a and 33b, and a liquid crystal 34.

The electrode 32a is formed on one surface of the substrate 31a, and the oriented film 33a is formed on a surface of the electrode 32a. Similarly, the electrode 32b is formed on one surface of the substrate 31b, and the oriented film 33b is formed on a surface of the electrode 32b. These arrangements are disposed substantially in parallel with each other at a predetermined distance, with the oriented films 33a and 33b being opposed to each other, and the gap between the oriented films 33a and 33b is filled with the liquid crystal 34.

The substrates 31a and 31b are formed of transparent parts, such as glass films or plastic films. The electrodes 32a and 32b are transparent electrodes formed of, for example, ITO (indium tin oxide). The oriented films 33a and 33b are formed of a material selected in accordance with a material of the liquid crystal 34. In this embodiment, the liquid crystal 34 is a two-color guest-host liquid crystal.

When a potential difference does not exist between the electrodes 32a and 32b, the orientation of the liquid-crystal molecules is determined by intermolecular forces between the liquid-crystal molecules and the oriented films 33a and 33b and between the liquid-crystal molecules themselves. When a potential difference exists between the electrodes 32a and 32b, the liquid-crystal molecules are polarized, causing a Coulomb force with an electric field between the electrodes 32a and 32b. Thus, when a potential difference exists, the orientation of the liquid-crystal molecules is determined by the balance between the Coulomb force and the intermolecular forces mentioned above. Thus, the orientation of the liquid-crystal molecules can be changed by changing the potential difference between the electrodes 32a and 32b, and the optical transmittance of the liquid-crystal light-amount adjusting unit 12 can be changed accordingly. Since the electrodes 32a and 32b are disposed substantially in parallel to each other, the electric field generated therebetween is substantially uniform in a plane that is parallel to the electrodes 32a and 32b. Thus, the optical transmittance of the liquid-crystal light-amount adjusting unit 12 becomes substantially uniform.

In the two-colored guest-host liquid crystal, dye molecules that determine optical characteristics (optical transmittance in this embodiment) have shapes like thin rods, and move in association with the liquid-crystal molecules. This movement occurs so that the potential energy associated with intermolecular forces with the liquid-crystal molecules becomes smaller. That is, the dye molecules move so as to become parallel with the liquid-crystal molecules.

More specifically, the orientation of the liquid-crystal molecules changes in accordance with the potential difference between the electrodes 32a and 32b, and the direction of absorption axis of the dye molecules changes in accordance with the change in the orientation of the liquid-crystal molecules, whereby the optical transmittance of the two-color guest-host liquid-crystal light-amount adjusting unit 12 changes.

Since the liquid-crystal molecules used in this embodiment are not spontaneously polarized and are polarized by an external electric field, the Coulomb potential is minimized when a polarization-facilitating axis of the liquid-crystal molecules coincides with the direction of the external electric field. Thus, regardless of the direction of the electric field, the orientation of the liquid-crystal molecules is determined by the intensity of the electric field alone. Thus, the effective power supplied from the electrodes 32a and 32b to the liquid crystal 34 is a function of the optical transmittance of the liquid-crystal light-amount adjusting unit 12. Since the frequency characteristics of the orientation of the two-color guest-host liquid crystal is on the order of several tens Hz, when pulses having a frequency that is sufficiently higher compared therewith (a frequency at which the direction of the orientation of the dye molecules does not follow change in the direction of the electric field) are applied to the electrodes 32a and 32b, the effective power is given by a duty ratio of the pulses multiplied by a pulse amplitude voltage.

Figure 3A:
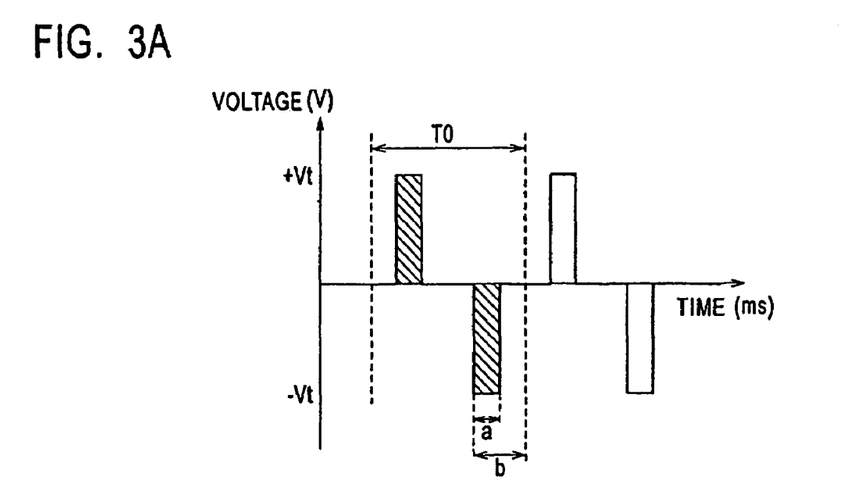
FIGS. 3A to 3C are diagrams showing an example of driving pulses and an example of optical transmittance.
Figure 3B:
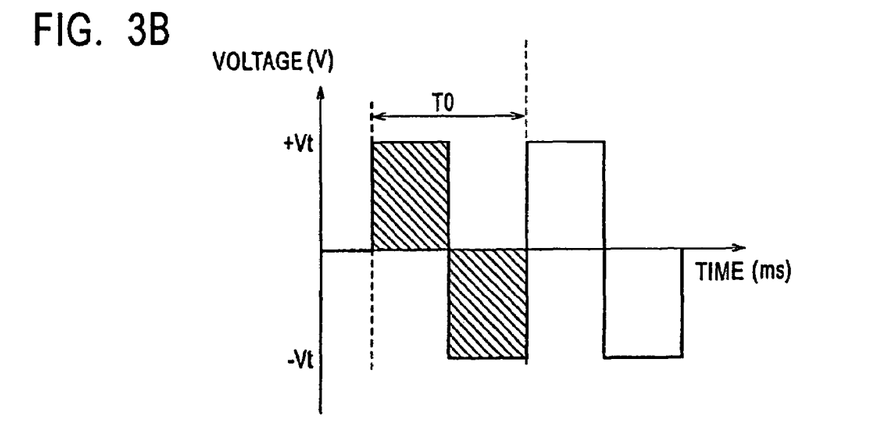
Figure 3C:
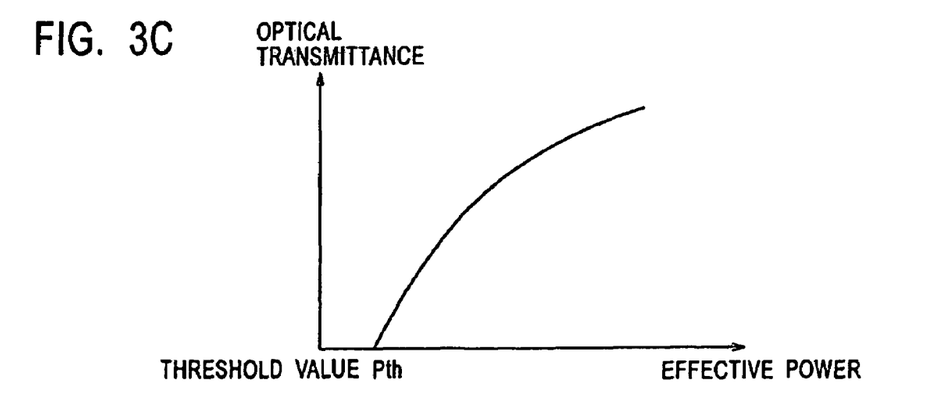

FIGS. 3A to 3C are diagrams showing an example of driving pulses and an example of optical transmittance.

FIGS. 3A and 3B show driving pulses. When effective powers in FIGS. 3A and 3B are compared with each other, the effective power is larger in FIG. 3B since the pulse width is larger. FIG. 3C shows an example of relationship between effective power and optical transmittance. As described above, if the frequency of pulses (1/T0) is sufficiently high, the effective power P is given by a duty ratio (D=a.times.100/b) multiplied by a pulse amplitude voltage Vt. As shown in FIG. 3C, the optical transmittance starts changing from a threshold value Pth, and increases as the effective power becomes larger. The optical transmittance has a one-to-one relationship with the effective power in a range of effective power larger than the threshold value Pth.

Referring back to FIG. 1, the light incident on the lens 13 is focused on a surface of the imaging device 14 through the lens 13. More specifically, the lens 13 is moved between the liquid-crystal light-amount adjusting unit 12 and the imaging device 14 along an optical axis by a moving mechanism not shown, thereby focusing the incident light on the imaging device 14 within a range of focal-depth.

Although an optical system having single lenses 11 and 13 is shown in FIG. 1 for simplicity of description, lens sets each including a plurality of lenses may be used in accordance with required capabilities of viewing-angle adjustment and focusing. Furthermore, the optical system may include a plurality of lens sets, e.g., three lens sets or four lens sets, for viewing-angle adjustment and focusing. In that case, the liquid-crystal light-amount adjusting unit 12 serves to change the aperture value similarly to a conventional diaphragm, and is disposed between a pair of lens sets among the plurality of lens sets.

The imaging device 14 performs photoelectric conversion for converting an incident light into an amount of electricity in accordance with the brightness of the incident light, signal accumulation for holding and integrating an amount of electricity for a certain period in order to improve sensitivity, and scanning for yielding time-series image signals from a spatial distribution of the amount of electricity obtained in relation to an image corresponding to the incident light. The imaging device 14 can be implemented by a solid-state imaging device such as a charge-coupled device (CCD).

An output from the imaging device 14 is processed by the signal processing circuit 18 in accordance with a desired video signal format, and the result is output from the signal processing circuit 18 to the microcomputer 19 or to a display or a recorder not shown. The temperature detecting circuit 21 detects an ambient temperature of the liquid-crystal light-amount adjusting unit 12, and outputs a result of detection to the microcomputer 19. The temperature detecting circuit 21 can be implemented, for example, by a thermistor. The microcomputer 19 is also connected to the storage circuit 20 that stores a comparison-value association table and various data, as will be described later.

The liquid-crystal light-amount adjusting unit 12 is driven by the driving circuit 15. The driving circuit 15 includes a driving-pulse generating circuit 16, and a plurality of comparison-value supplying circuits 17 for respectively supplying comparison values to the driving-pulse generating circuit 16. In this embodiment, the comparison-value supplying circuits 17 include four comparison-value supplying circuits 17a to 17d. The plurality of comparison-value supplying circuits 17a to 17d are controlled by the microcomputer 19, as will be described later, to respectively supply comparison values to the driving-pulse generating circuit 16.

Figure 4:
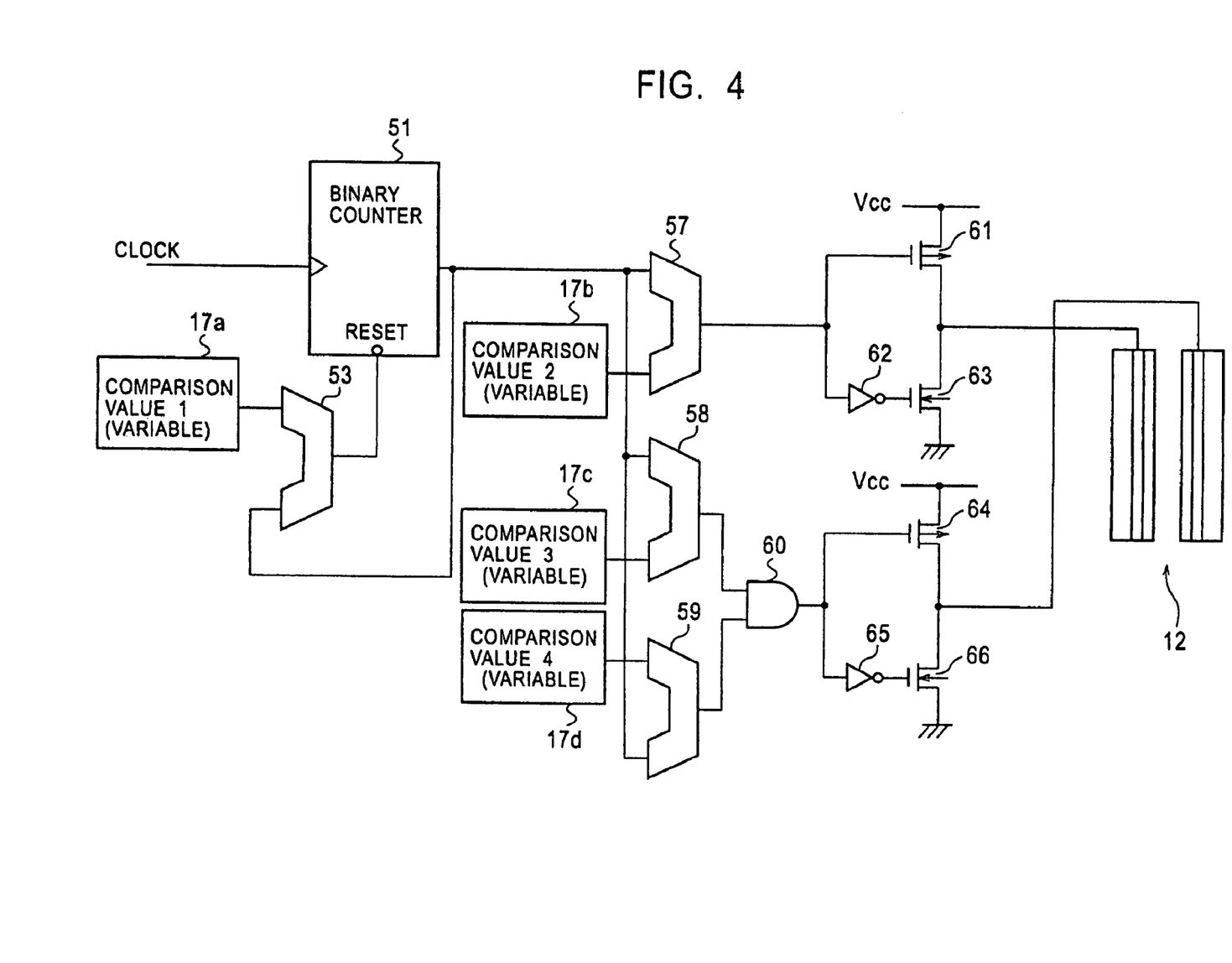
FIG. 4 is a diagram showing a driving-pulse generating circuit.

Next, the driving-pulse generating circuit 16 will be described.

FIG. 4 is a diagram showing the driving-pulse generating circuit.

Referring to FIG. 4, the driving-pulse generating circuit 16 includes a binary counter 51, comparators 53, 57, 58, and 59, an AND circuit 60, inverters 62 and 65, and field-effect transistors (FETs) 61, 63, 64, and 66.

The binary counter 51 has a clock input to which a clock signal having a predetermined cycle is input, and a reset input to which an output of the comparator 53 is input. An output of the binary counter 51 is input to the comparator 53, the comparator 57, the comparator 58, and to the comparator 59.

The comparator 53 also receives input of a comparison value 1 supplied from the comparison-value supplying circuit 17a. The comparator 53 compares the comparison value 1 with the output of the binary counter 51, and outputs an output signal if these values coincide with each other.

The comparator 57 also receives input of a comparison value 2 supplied from the comparison-value supplying circuit 17b. The comparator 57 compares the comparison value 2 with the output of the binary counter 51, and outputs an output signal if these values coincide with each other.

The comparator 58 also receives input of a comparison value 3 supplied from the comparison-value supplying circuit 17c. The comparator 58 compares the comparison value 3 with the output of the binary counter 51, and outputs an output signal if these values coincide with each other.

The comparator 59 also receives input of a comparison value 4 supplied from the comparison-value supplying circuit 17d. The comparator 59 compares the comparison value 4 with the output of the binary counter 51, and outputs an output signal if these values coincide with each other.

The output signal of the comparator 57 is supplied to the gate of the FET 61, and is also supplied, after being inverted by the inverter 62, to the gate of the FET 63. The source of the FET 61 is connected to a power source Vcc, and the drain of the FET 61 is connected to the source of the FET 63. A node between the drain of the FET 61 and the source of the FET 63 is connected to a first one of the electrodes 32a and 32b of the liquid-crystal light-amount adjusting unit 12. The drain of the FET 63 is grounded.

The FET 61 and the FET 63 are implemented by a pair of FETs of mutually different channel types. In this embodiment, the FET 61 is a p-channel FET and the FET 63 is an n-channel FET.

The output signals of the comparators 58 and 59 are input to the AND circuit 60. An output signal of the AND circuit 60 is supplied to the gate of the p-channel FET 64, and is also supplied, after being inverted by the inverter 65, to the gate of the n-channel FET 66. The source of the FET 64 is connected to the power source Vcc, and the drain of the FET 64 is connected to the source of the FET 66. A node between the drain of the FET 64 and the source of the FET 66 is connected to a second one of the electrodes 32a and 32b of the liquid-crystal light-amount adjusting unit 12. The drain of the FET 66 is grounded.

Next, the operation of the driving-pulse generating circuit will be described.

Figure 5A:
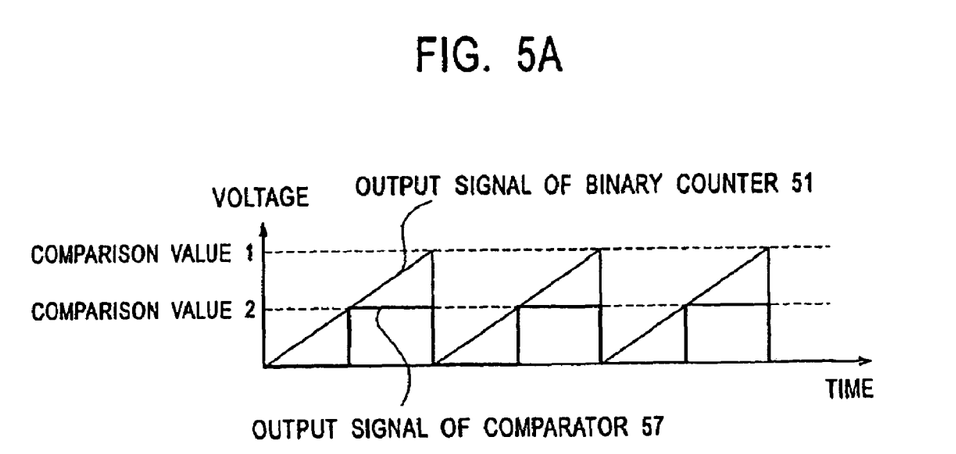
FIGS. 5A and 5B are (first) diagrams for explaining the operation of the driving-pulse generating circuit.
Figure 5B:
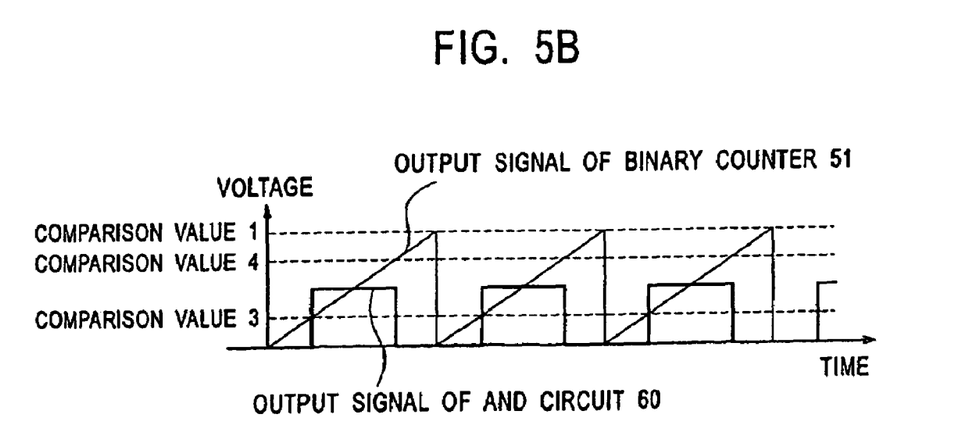

FIGS. 5A and 5B are (first) diagrams for explaining the operation of the driving-pulse generating circuit.

Figure 6:
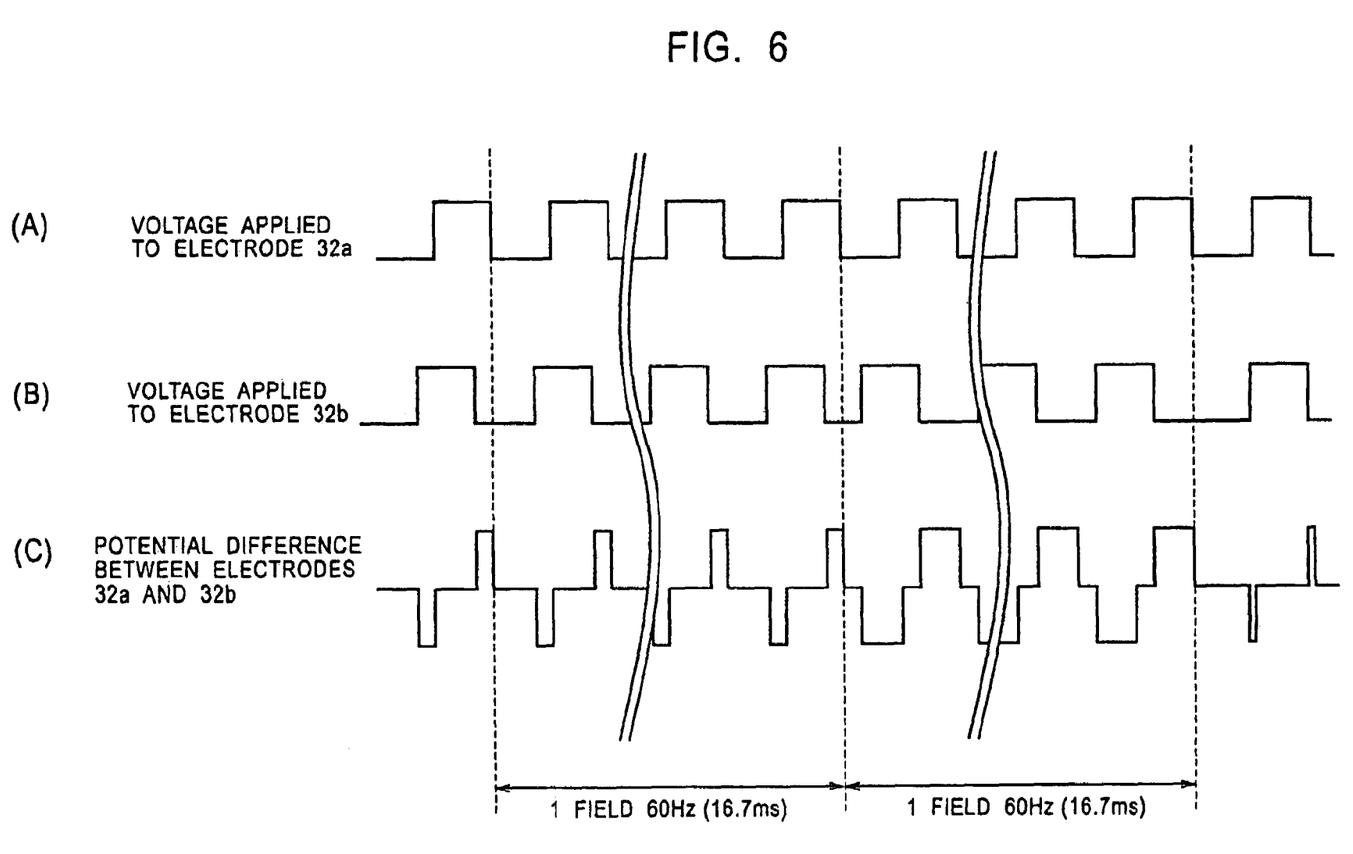
FIG. 6 is a (second) diagram for explaining the operation of the driving-pulse generating circuit.

FIG. 6 is a (second) diagram for explaining the operation of the driving-pulse generating circuit.

In FIGS. 5A and 5B, the horizontal axis represents time and the vertical axis represents voltage. In parts (A), (B), and (C) of FIG. 6, although axes are not shown, the horizontal direction represents elapse of time and the vertical direction represents voltage magnitude.

In FIGS. 5A and 5B, an output of the binary counter 51 is used as an input to the comparator 53, and an output of the comparator 53 is used as a reset input of the binary counter 51. Thus, the output of the binary counter 51 forms a triangular wave that is reset at the comparison value 1, as shown in FIGS. 5A and 5B. The triangular wave is input to each of the comparators 57, 58, and 59.

Thus, the output of the comparator 57 form pulses that rise at timings when the voltage value of the triangular wave coincides with the comparison value 2 and fall at timings when the voltage value of the triangular wave coincides with the comparison value 1, as shown in FIG. 5A. The output of the AND circuit 60, to which the outputs of the comparators 58 and 59 are input, forms pulses that rise at timings when the voltage value of the triangular wave coincides with the comparison value 3 and fall at timings when the voltage value of the triangular wave coincides with the comparison value 4, as shown in FIG. 5B.

The output of the comparator 57 is applied to the gate of the p-channel FET 61, and is also applied, via the inverter 62, to the gate of the n-channel FET 63. Thus, the voltage applied to the electrode 32a are pulses whose pulse widths are controlled in accordance with the magnitude of the comparison value 2, as shown in part (A) of FIG. 6. Furthermore, the output of the AND circuit 60 is applied to the gate of the p-channel FET 61, and is also applied, via the inverter 62, to the gate of the n-channel FET 63. Thus, the voltage applied to the electrode 32b are pulses whose pulse widths are controlled in accordance with the difference between the comparison values 3 and 4, as shown in part (B) of FIG. 6.

The pulses shown in parts (A) and (B) of FIG. 6 are applied to the electrodes 32a and 32b of the liquid-crystal light-amount adjusting unit 12, respectively. Thus, the potential difference between the electrodes 32a and 32b form pulses that fall to a predetermined pulse amplitude voltage −Vt when the voltage applied to the electrode 32b rises, that return to zero voltage when the voltage applied to the electrode 32a rises, that rise to a predetermined pulse amplitude voltage +Vt when the voltage applied to the electrode 32b falls, and that return to zero voltage when the voltage applied to the electrode 32a falls, as shown in part (C) of FIG. 6.

As described above, the period TO of the pulses applied between the electrodes 32a and 32b is controlled in accordance with the comparison value 1, and the duty ratio D thereof is controlled in accordance with the comparison values 2, 3, and 4.

Figure 7:
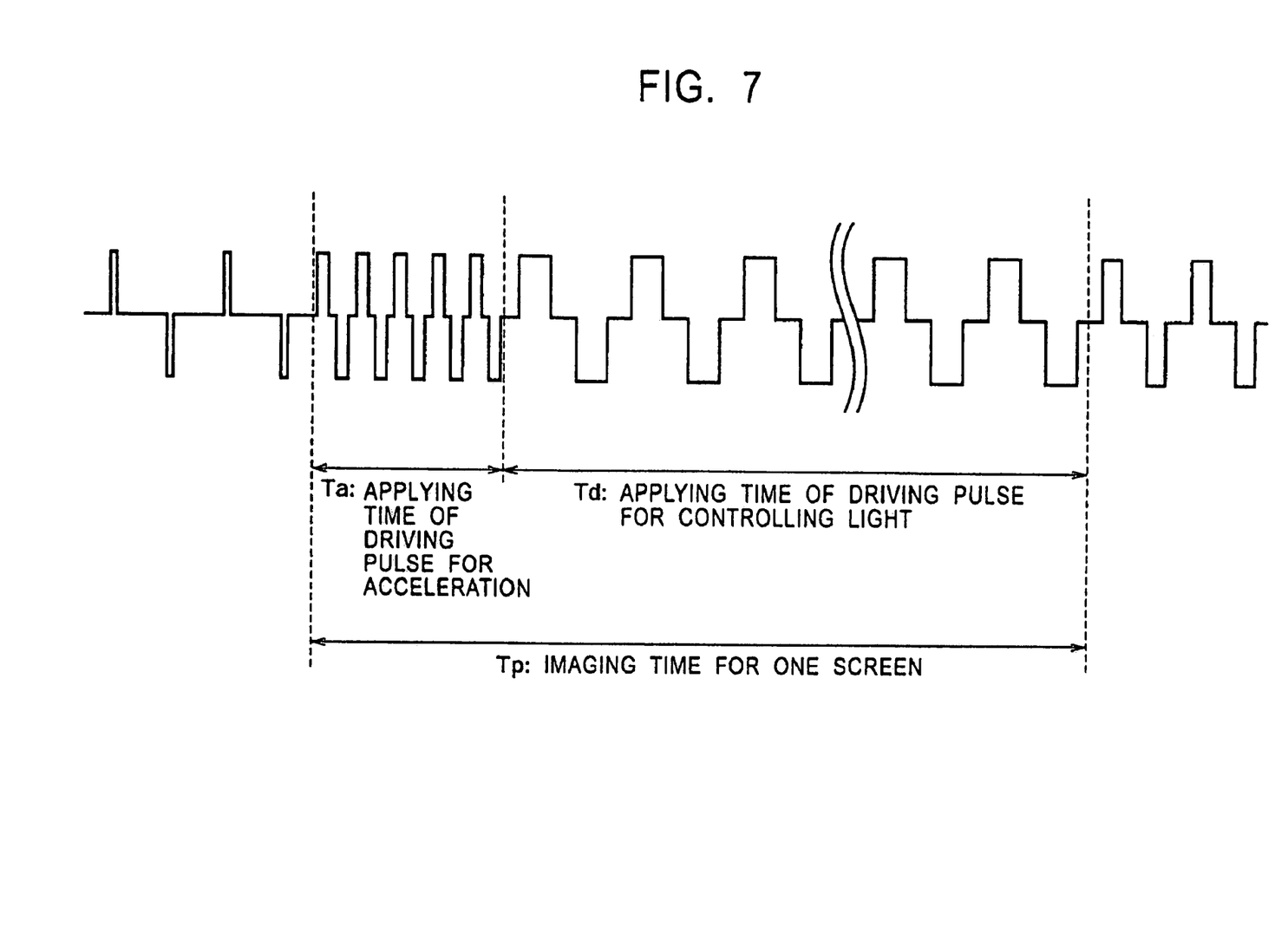
FIG. 7 is a diagram for explaining the operation of the liquid-crystal light-amount adjusting unit.

Next, a method of driving the liquid-crystal light-amount adjusting unit will be described.

FIG. 7 is a diagram for explaining a method of driving the liquid-crystal light-amount adjusting unit.

In FIG. 7, the horizontal direction represents elapse of time and the vertical direction represents voltage magnitude.

When an aperture value has been determined, the microcomputer 19, with consideration of a result of detection by the temperature detecting circuit 21, supplies driving pulses as shown in FIG. 7 from the driving circuit 15 to the liquid-crystal light-amount adjusting unit 12 so that an optical transmittance in accordance with the aperture value will be achieved.

For example, in the case of a video camera with a built-in camera, since a capturing time for one screen is predetermined, an optimal aperture value is calculated from the amount of light received by the imaging device 14. As another example, in the case of an electronic still camera, an aperture value is determined according to a program stored in the storage circuit 20 in the case of automatic exposure, and an aperture value is determined according to an input value input by a user via an input device not shown in the case of manual exposure.

The driving pulses include driving pulses for acceleration and driving pulses for dimming. The driving pulses for dimming are used to drive the liquid-crystal light-amount adjusting unit 12 so that an optical transmittance in accordance with the aperture value will be achieved. The frequency fd, the pulse amplitude Vt, and the duty ratio D of the driving pulses for dimming are determined with consideration of the areas of the electrodes 32a and 32b, the distance (gap) between the electrodes 32a and 32b, an ambient temperature, the type of material of the liquid crystal 34, etc. in the liquid-crystal light-amount adjusting unit 12. The driving pulses for acceleration are used to speed up response in changing the optical transmittance of the liquid-crystal light-amount adjusting unit 12. The frequency fa, the pulse amplitude Vt, the duty ratio D, and the applying time Ta of the driving pulses for acceleration are determined with consideration of relationship between current driving pulses for dimming and target driving pulses for dimming, in addition to the areas of the electrodes 32a and 32b, the distance (gap) between the electrodes 32a and 32b, an ambient temperature, the type of material of the liquid crystal 34, etc. in the liquid-crystal light-amount adjusting unit 12. More specifically, in order to reduce brightness (decrease optical transmittance) relative to an optical transmittance that is achieved by driving with the current driving pulses for dimming, the target driving pulses for dimming are adjusted so that the effective power thereof will be smaller than the effective power of the current driving pulses for dimming. On the other hand, in order to increase brightness (increase optical transmittance) relative to an optical transmittance that is achieved by driving with the current driving pulses for dimming, the target driving pulses for dimming are adjusted so that the effective power thereof will be larger than the effective power of the current driving pulses for dimming. If the pulse amplitude Vt is constant, the effective power is adjusted by adjusting the pulse width (duty ratio D).

Furthermore, the frequencies fd and fa of the driving pulses must be high enough not to cause flicker. If the frequency is low, polarized liquid-crystal molecules is able to follow the driving pulses alternating between +Vt and −Vt, so that flicker occurs due to the optical transmittance changing in synchronization with the pulse cycle.

Furthermore, the frequencies fd and fa of the driving pulses must be low enough so that the impedance of the liquid-crystal light-amount adjusting unit 12 remains. This is because adjustment of light amount is not allowed if the frequencies of the driving pulses are high and if the impedance of the liquid-crystal light-amount adjusting unit 12 is thus eliminated.

Furthermore, the driving pulses must avoid generating DC components. More specifically, if pulses having a ¼ period or pulses having a ½ period exist during the applying time Ta or the applying time Td, a DC component is generated. Thus, the number of pulses in the driving pulses must be an integer multiple of one period in each of the applying times Ta and Td. If a DC component is generated, the liquid crystal 34 is electrolyzed, and metallic ions, etc. in the liquid crystal 34 precipitates on the electrodes 32a and 32b. This inhibits transmittance of light, degrading performance of the liquid-crystal light-amount adjusting unit 12.

Since the imaging time Tp for one screen is predetermined, the applying time Td of the driving pulses for dimming is determined when the applying time Ta of the driving pulses for acceleration is determined. For example, if the liquid-crystal light-amount adjusting unit 12 is used in a video camera with a built-in camera, the imaging time Tp for one screen is approximately 16.7 ms corresponding to a field (a period of one cycle at 60 Hz) if imaging is performed on a field-by-field basis, or approximately 33.3 ms corresponding to a frame (a period of one cycle at 30 Hz) if imaging is performed on a frame-by-frame basis. As another example, if the liquid-crystal light-amount adjusting unit 12 is used in an electronic still camera or a still camera, the imaging time Tp for one screen is determined according to a shutter speed.

The driving pulses for acceleration are needed to be applied when the optical transmittance of the liquid-crystal light-amount adjusting unit 12 is to be changed. Thus, if the aperture value is not to be changed when capturing an image of a next screen, the driving pulses for acceleration are not needed, and the driving pulses for dimming are used over the entire imaging time Tp for one screen. That is, the applying time Td of the driving pulses for dimming is equal to the imaging time Tp for one screen.

Furthermore, in this embodiment, the driving pulses for dimming and the driving pulses for acceleration are determined by actual measurements, and stored in the storage circuit 20 in the form of a comparison-value association table. As will be understood from the description given above, the comparison-value association table includes a table of association between aperture values and driving pulses for dimming, defining association between a plurality of aperture values and driving pulses for dimming for achieving the respective aperture values, and a table of association between driving pulses for dimming and driving pulses for acceleration, defining association between a plurality of relationships between target driving pulses for dimming and respective driving pulses for acceleration. The comparison-value association table is created on a temperature-by-temperature basis at a predetermined temperature interval. The fields for driving pulses for dimming in the table of association between aperture values and driving pulses for dimming store comparison values 1 to 4 for generating the driving pulses for dimming, and the fields of driving pulses for acceleration in the table of association between driving pulses for dimming and driving pulses for acceleration store comparison values 1 to 4 and an applying time Ta of driving pulses for acceleration for generating the driving pulses for acceleration.

Thus, the microcomputer 19, when an aperture value is specified and a need is raised to change the aperture value, obtains the comparison values 1 to 4 for the driving pulses for acceleration and the applying time Ta of the driving pulses for acceleration, and the comparison values 1 to 4 for the driving pulses for dimming, from the comparison-value association table at a relevant temperature.

The microcomputer 19 first outputs the comparison values 1 to 4 for the driving pulses for acceleration to the comparison-value supplying circuits 17a to 17d of the driving circuit 15, and exercises control so that the comparison-value supplying circuits 17a to 17d will generate the associated comparison values 1 to 4.

The comparison-value supplying circuits 17a to 17d generate specified comparison values, and supplies the comparison values generated to the comparators 53, 57, 58, and 59, respectively.

The driving-pulse generating circuit 16 generates driving pulses for acceleration according to the comparison values, thereby driving the liquid-crystal light-amount adjusting unit 12.

When the applying time Ta of the driving pulses for acceleration elapses, the microcomputer 19 outputs the comparison values 1 to 4 for the driving pulses for dimming to the comparison-value supplying circuits 17a to 17d of the driving circuit 15, and exercises control so that the comparison-value supplying circuits 17a to 17d will generate the associated comparison values 1 to 4, respectively.

The comparison-value supplying circuits 17a to 17d generate the specified comparison values, and output the comparison values generated to the comparators 53, 57, 58, and 59, respectively.

The driving-pulse generating circuit 16 generates driving pulses for dimming in accordance with the comparison values, thereby driving the liquid-crystal light-amount adjusting unit 12.

The microcomputer 19 controls the comparison-value supplying circuits 17a to 17d so that the liquid-crystal light-amount adjusting unit 12 will be driven by the driving pulses for dimming until the imaging time Tp for one screen is reached.

As described above, the microcomputer 19 controls the driving circuit 15 to supply driving pulses to the liquid-crystal light-amount adjusting unit 12, thereby adjusting the amount of light to achieve a specified aperture value.

As described above, according to the present invention, the frequency fa of the driving pulses for acceleration and the frequency fd of the driving pulses for dimming are allowed to be different from each other.

Accordingly, the driving pulses for acceleration can be controlled independently of the driving pulses for dimming. Thus, the effective power of the driving pulses for acceleration can be optimized in accordance with the difference between the current optical transmittance and the target optical transmittance, the ambient temperature, the gap between the electrodes 32a and 32b, dye concentration, etc. in the liquid-crystal light-amount adjusting unit 12.

INDUSTRIAL APPLICABILITY

As described above, according to the present invention, before driving pulses for dimming with which a desired optical transmittance will be achieved are supplied to liquid crystal, predetermined driving pulses for acceleration are supplied, speeding up change in optical transmittance. Furthermore, the pulse shape of the predetermined driving pulses for acceleration and the pulse shape of the driving pulses for dimming can be controlled independently. Thus, the pulse shape of the driving pulses for acceleration can be controlled without being constrained by the pulse shape of the driving pulses for dimming. Accordingly, the predetermined driving pulses for acceleration are reliably obtained, serving to further enhance speed. Furthermore, in a liquid-crystal light-amount adjusting device, power consumption is reduced and lifetime is extended.

What is claimed is:

1. A liquid-crystal light-amount adjusting device comprising:
    a driving-pulse generating circuit for generating driving pulses having pulsed voltages;
    a liquid-crystal light-amount adjusting unit, to which the driving pulses are supplied, for changing an optical transmittance of a liquid crystal according to pulse shapes of the driving pulses;
    a control circuit for controlling frequencies and duty ratios of the driving pulses; and
    a temperature detecting circuit for detecting an ambient temperature of the liquid-crystal light-amount adjusting unit and outputting a result of detection to the control circuit, the control circuit changing the frequencies of the driving pulses in accordance with the ambient temperature,
    wherein the control circuit exercises control so that the driving-pulse generating circuit generates driving pulses for acceleration for a first applying time, having a pulse shape with a first frequency and a first duty ratio, and driving pulses for dimming for a second applying time, having a pulse shape with a second frequency that is different from the first frequency and a second duty ratio that is different from the first duty ratio,
    wherein the first frequency and the first duty ratio and the first applying time are based upon the driving pulses for dimming and the second applying time is determined from the first applying time,
    wherein the number of pulses in the driving pulses for acceleration is an integer multiple of one period in the first applying time and the number of pulses in the driving pulses for dimming is an integer multiple of one period in the second applying time.

2. A liquid-crystal light-amount adjusting device according to claim 1, comprising:
- a storage circuit for storing an association table defining association of an optical transmittance with driving pulses for acceleration and driving pulses for dimming for achieving the optical transmittance,
- wherein the control circuit exercises control so that the driving-pulse generating circuit, by referring to the association table, generates driving pulses with which a desired optical transmittance is achieved.

3. A method of driving a liquid-crystal light-amount adjusting device, comprising:
- acceleration driving pulses, having a frequency that is different from a frequency of driving pulses having a pulse shape in accordance with a desired optical transmittance, are supplied to the liquid crystal;
- dimming driving pulses, having a pulse shape in accordance with the desired optical transmittance, are supplied to the liquid crystal;
- changing an optical transmittance of the liquid-crystal in accordance with the pulse shapes of the acceleration driving pulses and dimming driving pulses supplied to the liquid crystal;
- detecting an ambient temperature of the liquid-crystal light-amount adjusting unit; and
- changing the respective frequencies of the acceleration driving pulses and the dimming driving pulses in accordance with the ambient temperature,
- wherein a frequency, a pulse amplitude, a duty ratio, and a first applying time of the acceleration driving pulses are based on the dimming driving pulses and a second applying time of the dimming driving pulses is determined from the first applying time,
- wherein the number of pulses in the acceleration driving pulses is an integer multiple of one period in the first applying time and the number of pulses in the dimming driving pulses is an integer multiple of one period in the second applying time.

4. A camera comprising:
- an optical system for focusing light coming from a target on an imaging surface;
- a liquid-crystal light-amount adjusting unit for adjusting an amount of the light that reaches the imaging surface, by changing an optical transmittance of a liquid crystal;
- a driving-pulse generating circuit for generating driving pulses having pulsed voltages, the driving pulses being supplied to the liquid crystal to change the optical transmittance; and
- a control circuit for controlling frequencies and duty ratios of the driving pulses;
- a temperature detecting circuit for detecting an ambient temperature of the liquid-crystal light-amount adjusting unit and outputting a result of detection to the control circuit, the control circuit changing the frequencies of the driving pulses in accordance with the ambient temperature,
- wherein the control circuit exercises control so that the driving-pulse generating circuit generates driving pulses for acceleration for a first applying time, having a first frequency and a first duty ratio, and driving pulses for dimming for a second applying time, having a second frequency that is different from the first frequency and a second duty ratio that is different from the first duty ratio,
- wherein the first frequency and the first duty ratio and the first applying time are based upon the driving pulses for dimming and the second applying time is determined from the first applying time,
- wherein the number of pulses in the driving pulses for acceleration is an integer multiple of one period in the first applying time and the number of pulses in the driving pulses for dimming is an integer multiple of one period in the second applying time.

5. A camera comprising:
- an optical system for focusing light coming from a target on an imaging surface;
- a liquid-crystal light-amount adjusting unit for adjusting an amount of the light that reaches the imaging surface, by changing an optical transmittance of a liquid crystal;
- a driving-pulse generating circuit for generating driving pulses having pulsed voltages, the driving pulses being supplied to the liquid crystal to change the optical transmittance;
- a control circuit for controlling a frequency and a duty ratio of the driving pulses; wherein the control circuit changes the frequency of the driving pulses during-imaging for one screen into a first applying time of driving pulses for acceleration and a second applying time for driving pulses for dimming; and
- a temperature detecting circuit for detecting an ambient temperature of the liquid-crystal light-amount adjusting unit and outputting a result of detection to the control circuit, the control circuit changing the frequencies of the driving pulses in accordance with the ambient temperature,
- wherein a first frequency and a first duty ratio and the first applying time of the driving pulses of accelerations are based upon the driving pulses for dimming and the second applying time is determined from the first applying time,
- wherein the number of pulses in the driving pulses for acceleration is an integer multiple of one period in the first applying time and the number of pulses in the driving pulses for dimming is an integer multiple of one period in the second applying time.

6. A camera according to claim 5, wherein an imaging time for one screen is a sum of the first applying time and the second applying time.

* * * * *